United States Patent
Imasaka et al.

(10) Patent No.: US 11,707,853 B2
(45) Date of Patent: Jul. 25, 2023

(54) LINEAR EXPANSION MECHANISM

(71) Applicant: FANUC CORPORATION, Yamanashi (JP)

(72) Inventors: Kousuke Imasaka, Yamanashi (JP); Kuniyasu Matsumoto, Yamanashi (JP); Wataru Amemiya, Yamanashi (JP); Moriaki Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 17/037,823

(22) Filed: Sep. 30, 2020

(65) Prior Publication Data
US 2021/0101296 A1    Apr. 8, 2021

(30) Foreign Application Priority Data
Oct. 4, 2019    (JP) .............................. JP2019-183641

(51) Int. Cl.
*B25J 18/02*    (2006.01)
*B25J 9/10*    (2006.01)

(52) U.S. Cl.
CPC .............. *B25J 18/02* (2013.01); *B25J 9/104* (2013.01)

(58) Field of Classification Search
CPC . B25J 9/102; B25J 9/023; B25J 9/0093; B25J 9/041; B25J 9/10; B25J 9/104; B25J 18/02; F16G 13/20; F16G 13/18; F16G 13/22; F16G 13/24; F16G 13/02; F16G 13/04; F16G 13/08; F16G 13/14; F16G 15/04; F16G 15/06; F16G 15/12; F16G 15/14; F22B 37/483; F28G 15/04

USPC .......... 74/490.01, 665 GE, 89.2, 37; 174/69; 138/120; 474/202, 204, 205, 206; 254/1, 254/311; 52/108
See application file for complete search history.

(56) References Cited

U.S. PATENT DOCUMENTS

| | | | | |
|---|---|---|---|---|
| 5,970,701 | A | * | 10/1999 | Roden ..................... F16G 13/20 59/78 |
| 8,621,954 | B1 | * | 1/2014 | Dellon ....................... 74/490.01 |
| 9,248,576 | B2 | | 2/2016 | Yoon |
| 2006/0219144 | A1 | * | 10/2006 | Phelan ..................... B66F 3/06 114/90 |

(Continued)

FOREIGN PATENT DOCUMENTS

| | | |
|---|---|---|
| JP | S62-148186 A | 7/1987 |
| JP | 2545163 B2 * | 10/1996 |
| JP | 5435679 B2 | 3/2014 |

(Continued)

*Primary Examiner* — T. Scott Fix
(74) *Attorney, Agent, or Firm* — Nakanishi IP Associates, LLC

(57) ABSTRACT

In a linear expansion mechanism, high rigidity is secured in all directions of orthogonal axes without any constraint on installation posture. The linear expansion mechanism includes: a block train made up of a plurality of blocks coupled along a coupling direction; a housing for containing the block train; a mechanism configured to deliver and draw the block train along the coupling direction; and a fixing mechanism configured to fix a relative position of a leading end position of the block train delivered from the housing relative to an entrance/exit position Pe located on the housing at which the block train enters and exits the housing with respect to directions orthogonal to the coupling direction of the block train.

5 Claims, 14 Drawing Sheets

(56) References Cited

U.S. PATENT DOCUMENTS

2018/0372195 A1* 12/2018 Yoon ..................... F16H 19/04

FOREIGN PATENT DOCUMENTS

| JP | 2015-213974 A | 12/2015 | | |
|----|----|----|----|----|
| WO | WO-2009130444 A1 * | 10/2009 | .............. | B25J 18/06 |
| WO | WO-2017208872 A1 * | 12/2017 | .............. | B25J 18/02 |
| WO | WO-2019093718 A1 * | 5/2019 | .............. | B25J 18/02 |
| WO | WO-2019110724 A1 * | 6/2019 | ................ | B66F 9/08 |

\* cited by examiner

LINEAR EXPANSION MECHANISM

CROSS-REFERENCE TO RELATED APPLICATIONS

This application is based upon and claims the benefit of priority from the Japanese Patent Application No. 2019-183641, filed Oct. 4, 2019 the entire contents of which are incorporated herein by reference.

FIELD

Embodiments described herein relate generally to a linear expansion mechanism.

BACKGROUND

A linear expansion mechanism is safer because any elbow joint can be eliminated, and thus is expected to be applied to a collaborative robot. For such a linear expansion mechanism, a structure that is under research delivers and withdraws a block train made up of a plurality of coupled blocks (refer to Patent Literatures 1, 2, and 3).

To implement a linear expansion mechanism to a robot, it is required to secure high rigidity in all directions of orthogonal 3 axes to prevent a torsion and a rattling in front-back direction in addition to up-and-down and right-and-left deflections as much as possible, while minimizing mismatch between an actual position and a controlled position of an arm leading end. Further, depending on its application, the robot arm is not only to be installed vertically on a floor, but also to be installed horizontally on a wall or hung from a ceiling. Accordingly, the robot arm is required to operate normally in any of the various installation postures as those described above.

CITATION LIST

Patent Literature

Patent Literature 1: Japanese Patent No. 5435679.
Patent Literature 2: Japanese Unexamined Patent Application Publication No. 2015-213974.
Patent Literature 3: Japanese Unexamined Patent Application Publication No. S62-148186.

SUMMARY OF INVENTION

Technical Problem

There is a need for a linear expansion mechanism in which high rigidity is secured in all directions of the orthogonal 3 axes for an improved positional accuracy without any constraint on the installation posture.

Solution to Problem

A linear expansion mechanism according to an aspect of the disclosure includes: a block train made up of a plurality of blocks coupled along a coupling direction; a housing for containing the block train; a mechanism configured to deliver and draw the block train along the coupling direction; a restraining structure configured to restrain an entrance/exit position with respect to 2 directions orthogonal to the coupling direction of the block train, the entrance/exit position located on the housing at which the block train enters and exits the housing; and a fixing mechanism configured to fix a relative position of a leading end of the block train delivered from the housing relative to the entrance/exit position, the relative position being fixed with respect to 2 directions.

According to the aspect, there can be provided a linear expansion mechanism in which high rigidity is secured in all directions of orthogonal 3 axes for an improved positional accuracy without any constraint on the installation posture.

DETAILED DESCRIPTION

Figure 1:
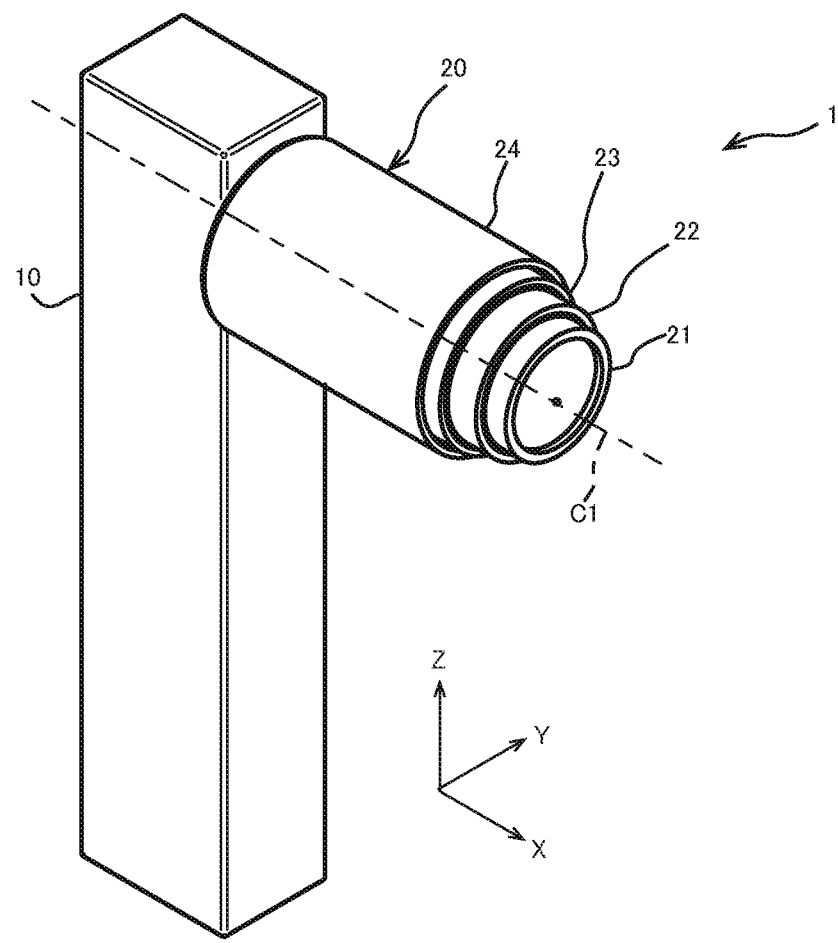
FIG. 1 is a perspective view of a retracted linear expansion mechanism according to an embodiment.

A linear expansion mechanism according to an embodiment will now be described with reference to drawings. In the description below, components that have substantially like functions and configurations will have like reference characters and the description will be repeated only as necessary. The linear expansion mechanism according to the embodiment may be used alone, or may be used for a linear motion extendable joint of a robot arm mechanism.

Figure 2:
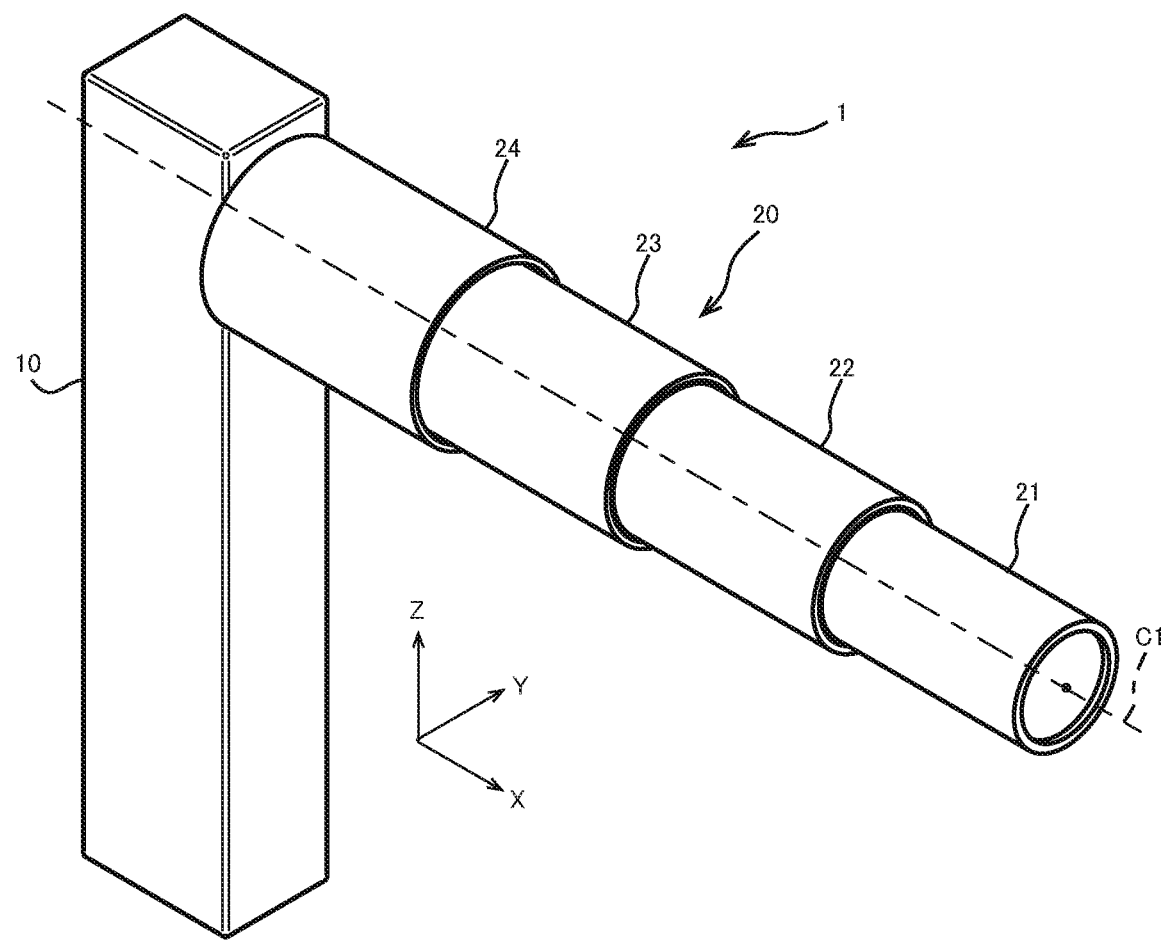
FIG. 2 is a perspective view of an extended linear expansion mechanism.

As illustrated in FIGS. 1 and 2, the linear expansion mechanism 1 includes an extendable arm unit 20 and a housing 10 that supports the arm unit 20. The arm unit 20 typically includes a plurality, four herein, of 4 cylindrical bodies 21, 22, 23, and 24 ruggedly assembled in a telescopic structure (multi-stage nested structure). Each of the cylindrical bodies 21, 22, 23, and 24 typically has a cylindrical shape, while it may have a rectangular tube shape. The housing 10 has a hollow, typically square pole shape. Note that the shape of the housing 10 may not be limited to a square pole shape, and may be any other shape such as cylindrical shape.

With its flange, a tail-end cylindrical body 24 among the plurality of cylindrical bodies 21, 22, 23, and 24 is fixed to an upper portion of the housing 10 in such a way that an angle formed between a cylinder center line C1 and a center line of the housing 10 is maintained at a predetermined angle. As used hereinafter, among orthogonal 3 axes, Z-axis refers to an axis parallel to the center line of the housing 10, X-axis refers to an axis parallel to the cylinder center line C1, and Y-axis refers to an axis perpendicular to both X-axis and Z-axis.

Figure 3:
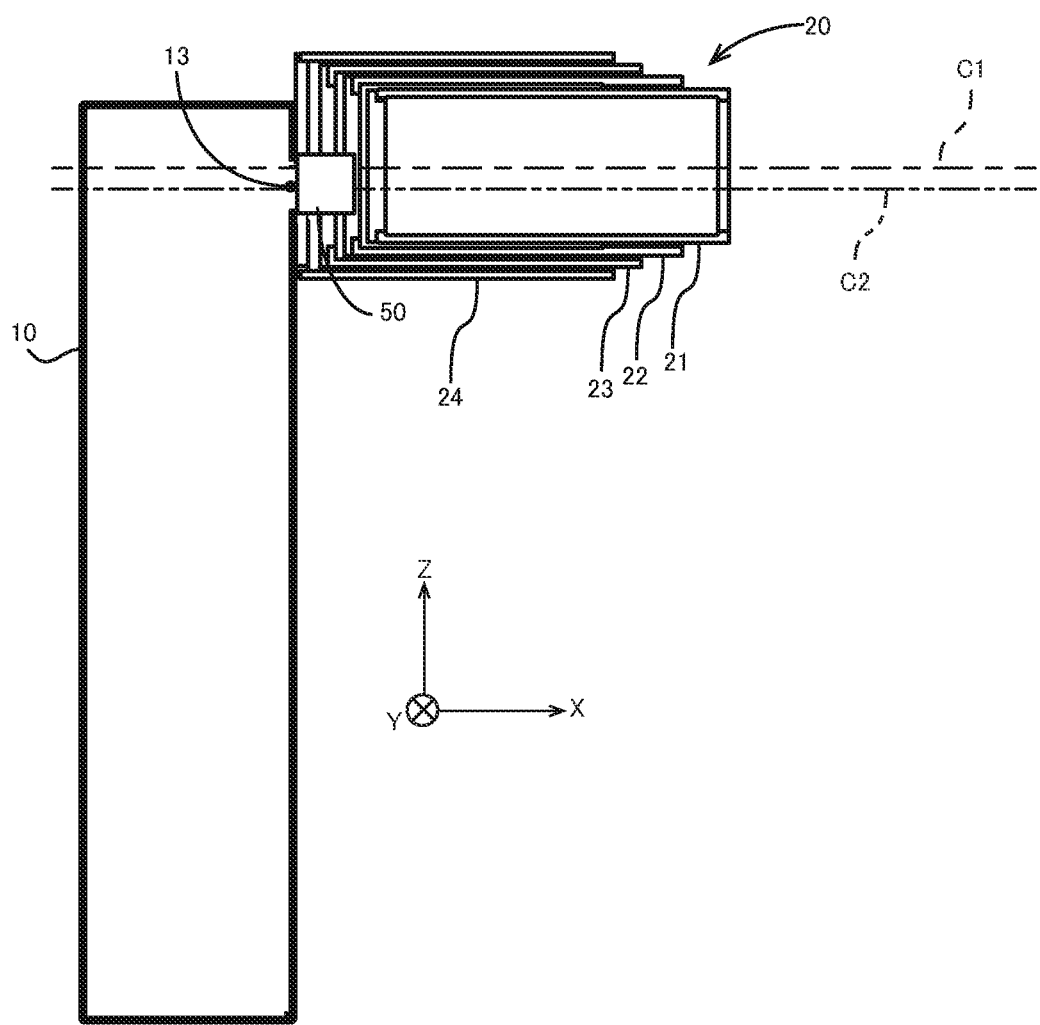
FIG. 3 is a side view of the internal structure of the retracted linear expansion mechanism with an arm unit removed.

As illustrated in FIG. 3, an opening 13 (hereinafter referred to as housing opening 13) is provided on a side wall in the upper portion of the housing 10 to which the tail-end cylindrical body 24 is fixed. Through the housing opening 13, the internal space of the housing 10 is in communication with the hollow internal spaces of the cylindrical bodies 21, 22, 23, and 24. The housing opening 13 serves as an entrance for a block train 30 described later to enter and exit the housing 10.

Figure 4:
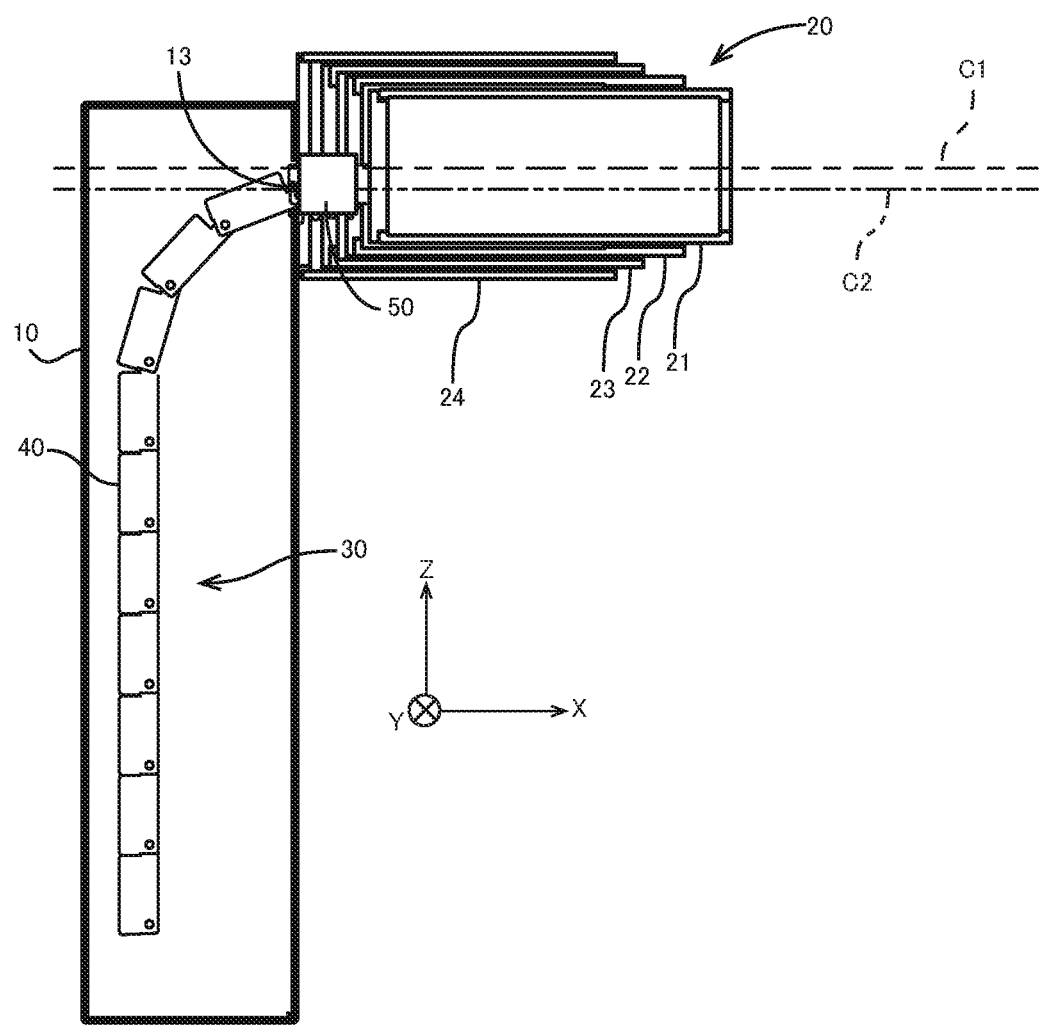
FIG. 4 is a side view of the internal structure of the retracted linear expansion mechanism.
Figure 5:
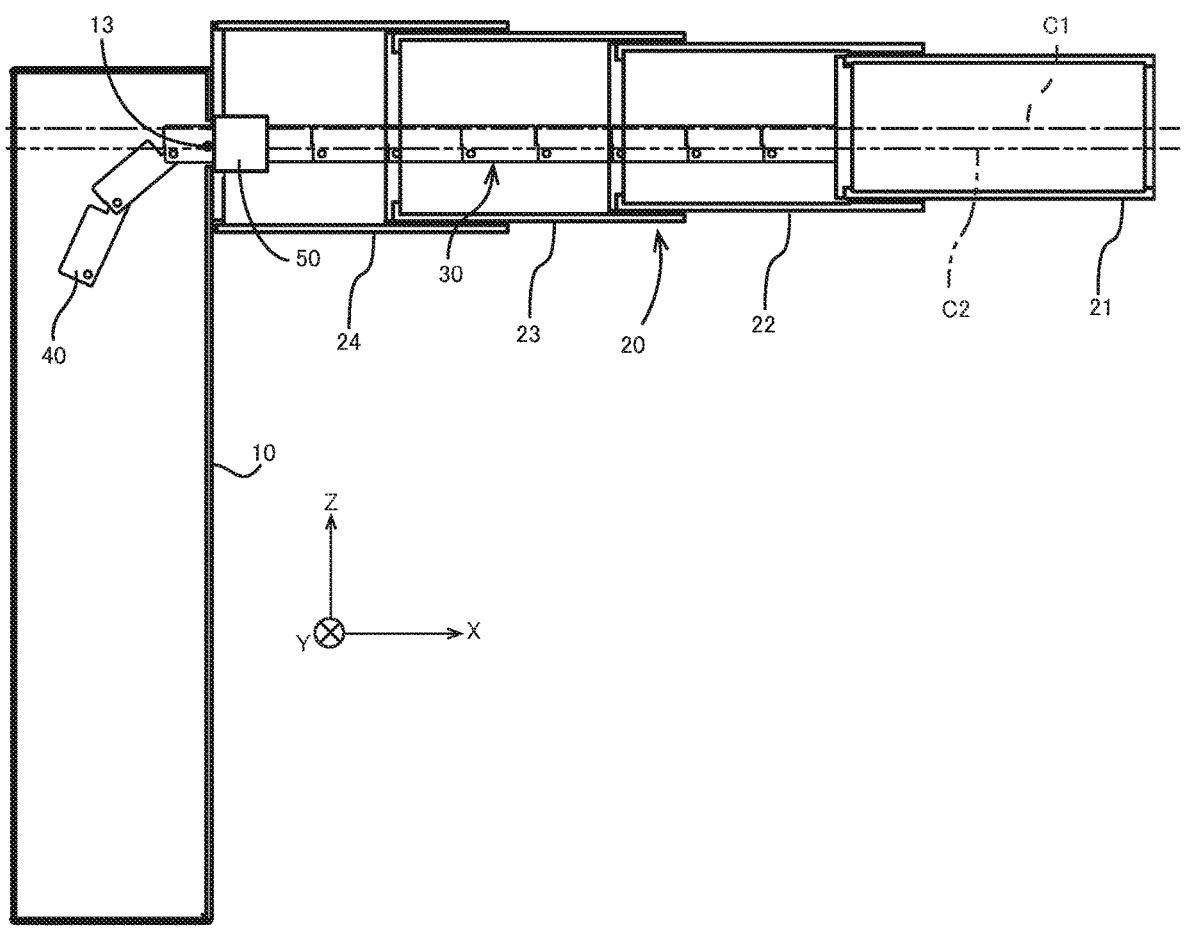
FIG. 5 is a side view of the internal structure of the extended linear expansion mechanism.

As illustrated in FIGS. 4 and 5, a block train 30 is inserted in an inner space formed of the internal space of housing 10 to the hollow internal spaces of the cylindrical bodies 21, 22, 23, and 24 in communication with each other. The block train 30 is made up of a plurality of blocks 40 coupled to each other to form a train. A forefront-end block 40 is connected to the forefront-end cylindrical body 21. As described in detail later, an entrance/exit position located on the housing 10 at which the block train 30 enters and exits the housing 10 is restrained with respect to 2 directions (YZ) orthogonal to a coupling direction (C2) of the block train 30. In addition, a leading end position of the block train 30 delivered from the housing 10 is fixed relative to the entrance/exit position with respect to the 2 directions (YZ) by a multi-stage nested structure. Accordingly, the block train 30 can move linearly.

Figure 6:
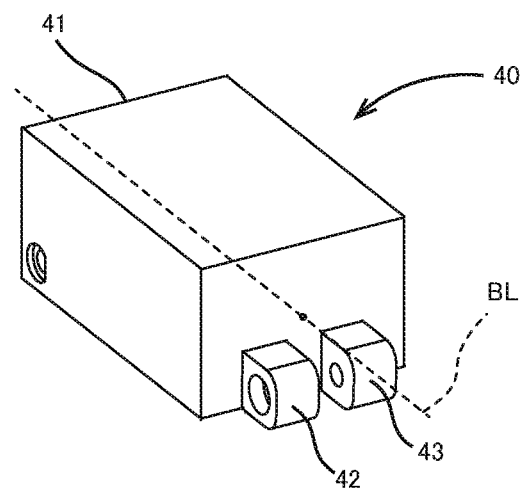
FIG. 6 is a front perspective view of a block in FIG. 4.
Figure 7:
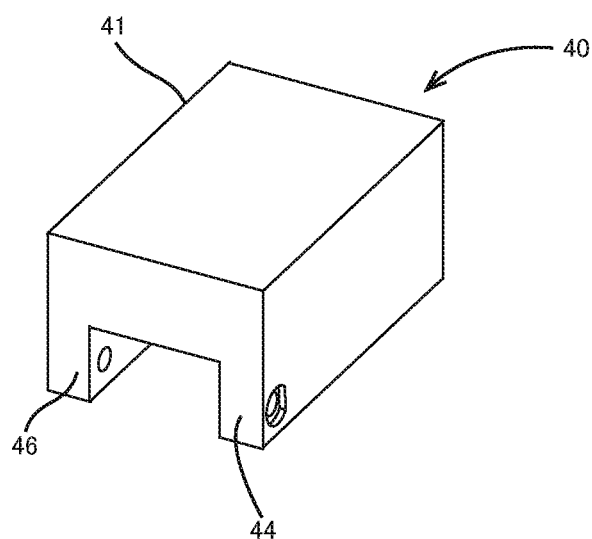
FIG. 7 is a back perspective view of a block in FIG. 4.

As illustrated in FIGS. 6 and 7, the block 40 includes a block body 41. The block body 41 has, for example, a rectangular parallelepiped shape. In a lower portion of a front end of the block body 41, there are provided 2 forward protruding bearings 42 and 43 spaced apart from each other in a width direction. In a lower portion of a trailing end of the block body 41, there are provided bearings 44 and 46 formed integrally with the block body 41 equidistantly spaced apart from each other in the width direction. The bearings 42 and 43 on the front end of one block 40 of adjacent 2 blocks 40 are fitted between the bearings 44 and 46 on the trailing end of the other block 40, and a rotary shaft, which is not illustrated, is inserted in continuous holes. In this way, the blocks 40 are rotatably coupled to each other to form a train. Note that the blocks 40 are coupled to form a train along a direction (coupling direction) orthogonal to the rotary shaft.

Figure 8:
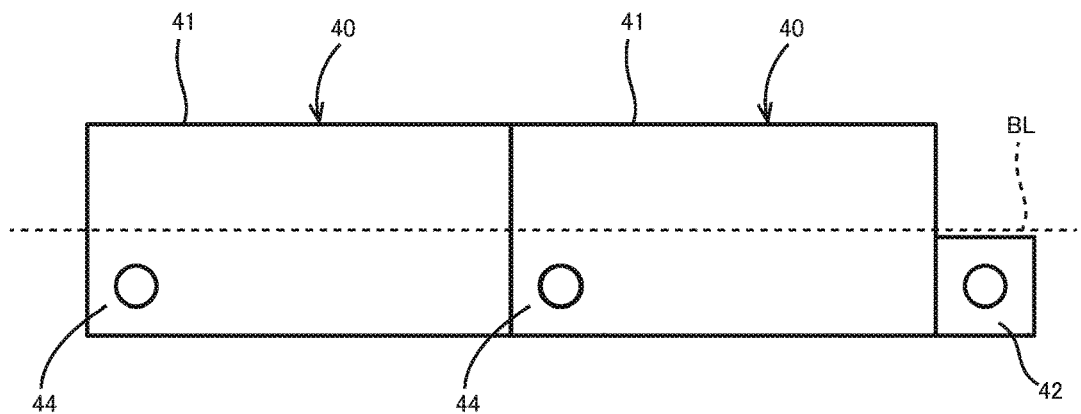
FIG. 8 is a side view of blocks in FIG. 4.

As illustrated in FIG. 8, since the bearings 42, 43, 44, and 46 are provided near the bottom of the block body 41 and the block body 41 has a rectangular parallelepiped shape, two adjacent blocks 40, when linearly arranged, abut against each other in end faces of the blocks and are restrained from rotating further upward, while the blocks are allowed to rotate downward. For the purpose of illustration, a base line BL is defined to be a reference for the block 40. The base line BL is parallel to a length direction (front-back direction) of the block body 41 and passes through the center of the width and height of the block body 41. Note that the base line BL of linearly-arranged blocks 40 defines a movement axis C2 of the block train 30.

Now, return to FIGS. 4 and 5. The forefront-end block 40 of the block train 30 is connected to the forefront-end cylindrical body 21 among the plurality of cylindrical bodies 21, 22, 23, and 24. With the arm unit 20 in the retracted state, most of the block train 30 is contained in the housing 10. In the internal space of the housing 10, a drive mechanism configured to provide delivery and withdrawal actions of the block train 30 is provided. As a drive mechanism, any mechanism is adopted such as a rack and pinion mechanism and a ball screw mechanism.

The followings are basic extending and retracting actions of the linear expansion mechanism 1.

The block train 30 contained in the housing 10 is delivered into the arm unit 20 through the housing opening 13 by the drive mechanism, and the forefront-end block 40 is moved frontward. The forefront-end block 40 is connected to the forefront-end cylindrical body 21. Accordingly, as the forefront-end block 40 moves frontward, other cylindrical bodies 21, 22, and 23 are drawn one after another from the tail-end cylindrical body 24 fixed to the housing 10. As a result, the arm unit 20 is extended forward along the cylinder center line C1.

The drive mechanism causes the block train 30 delivered into the arm unit 20 to be withdrawn through the housing opening 13 into the housing 10, and the forefront-end block 40 is moved backward. As the forefront-end block 40 moves backward, the cylindrical bodies are contained back into the cylindrical body behind, starting from the forefront-end cylindrical body 21. As a result, the arm unit 20 is retracted backward along the cylinder center line C1.

In above-described extending and retracting actions of the linear expansion mechanism 1, looseness of the block train 30 in the up-and-down and right-and-left directions reduces a positional accuracy of the leading end of the arm unit 20. To secure the positional accuracy of the leading end of the arm unit 20, the block train 30 is required to move linearly and in parallel to the cylinder center line C1.

The linear expansion mechanism 1 includes a restraining structure 50 configured to restrain an entrance/exit position Pe located on the housing 10 at which the block train 30 enters and exits the housing 10, in order to linearly move the block train 30 delivered through the housing opening 13 from the internal space of the housing 10 into the arm unit 20 along the movement axis C2 parallel to the cylinder center line C1. The entrance/exit position Pe is defined as a position at which the base line BL of the block 40 passing through the housing opening 13 intersects a housing opening plane. The entrance/exit position Pe is restrained by the restraining structure 50 with respect to the base line BL of linearly-arranged blocks 40, in other words, in 2 directions (YZ) orthogonal to the movement axis C2. The YZ positions of the entrance/exit position Pe are fixed.

Figure 9:
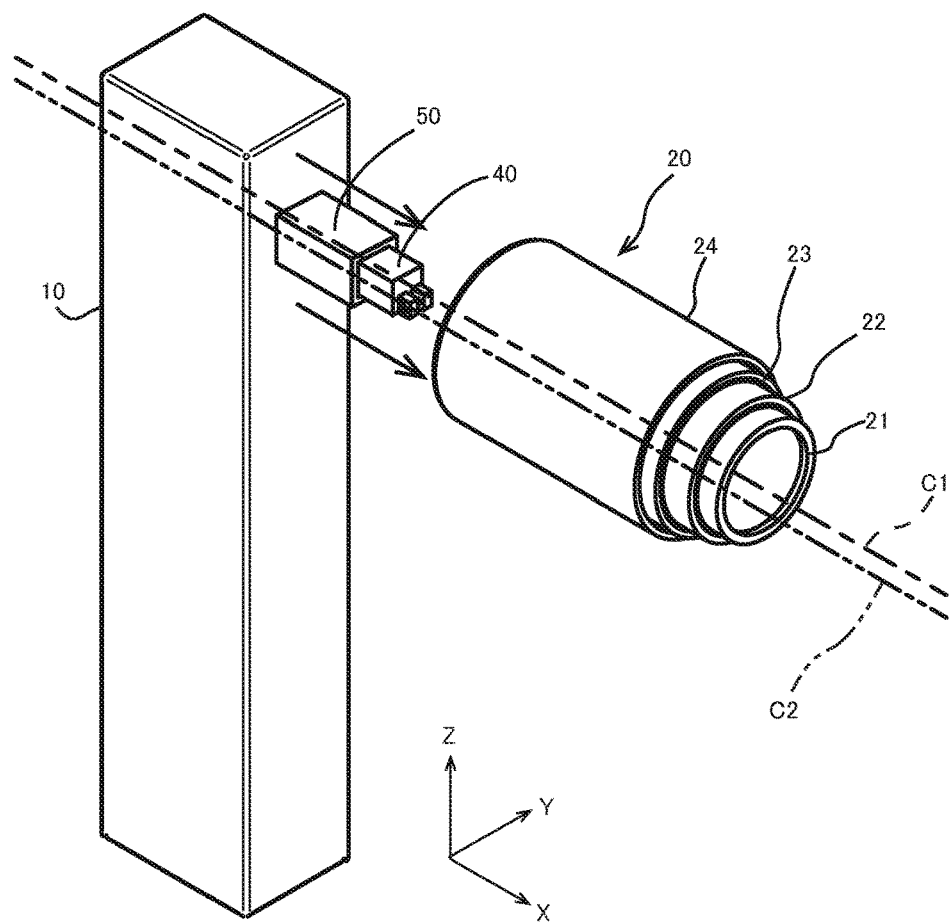
FIG. 9 is a perspective view illustrating a rectangular-cylindrical holder configured to restrain the entrance/exit position for the block train of the linear expansion mechanism in FIG. 4.
Figure 10:
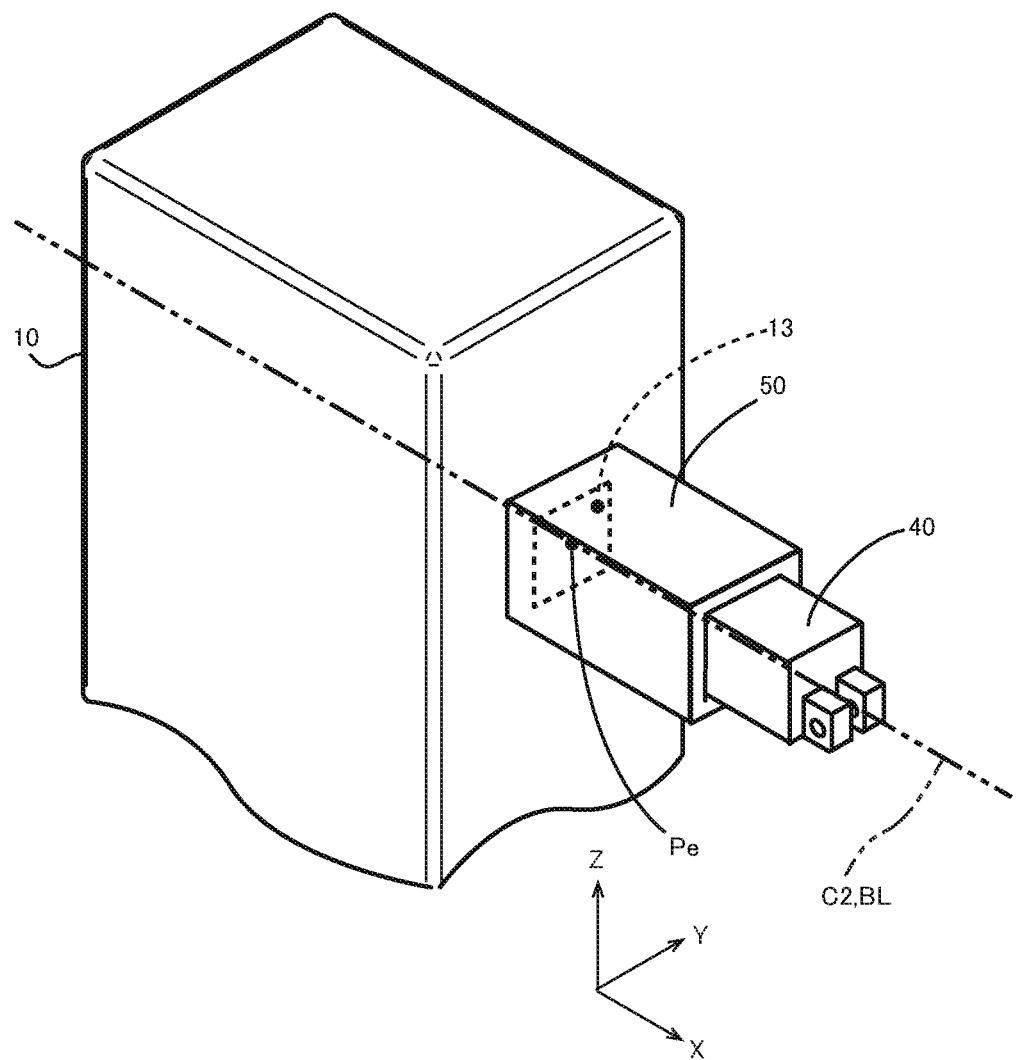
FIG. 10 is a partial enlarged view of FIG. 9.
Figure 11:
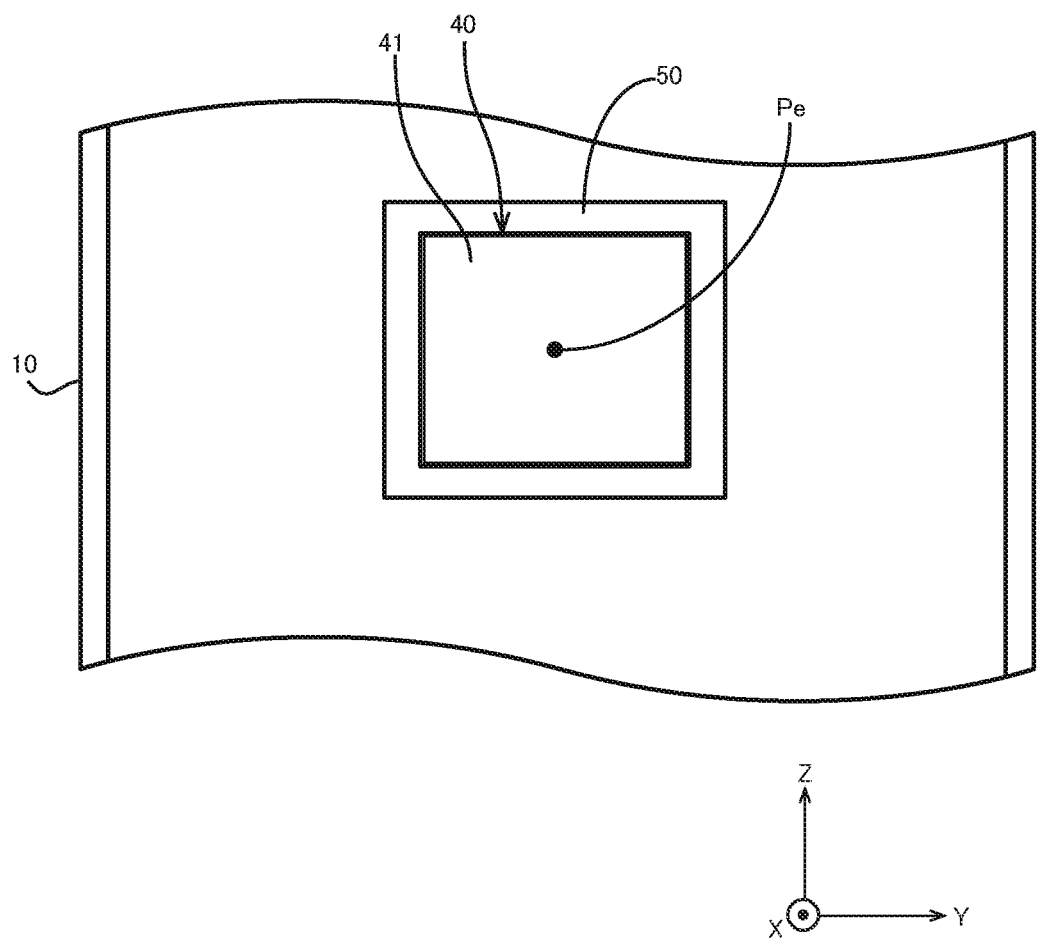
FIG. 11 is a front view of FIG. 10.
Figure 12:
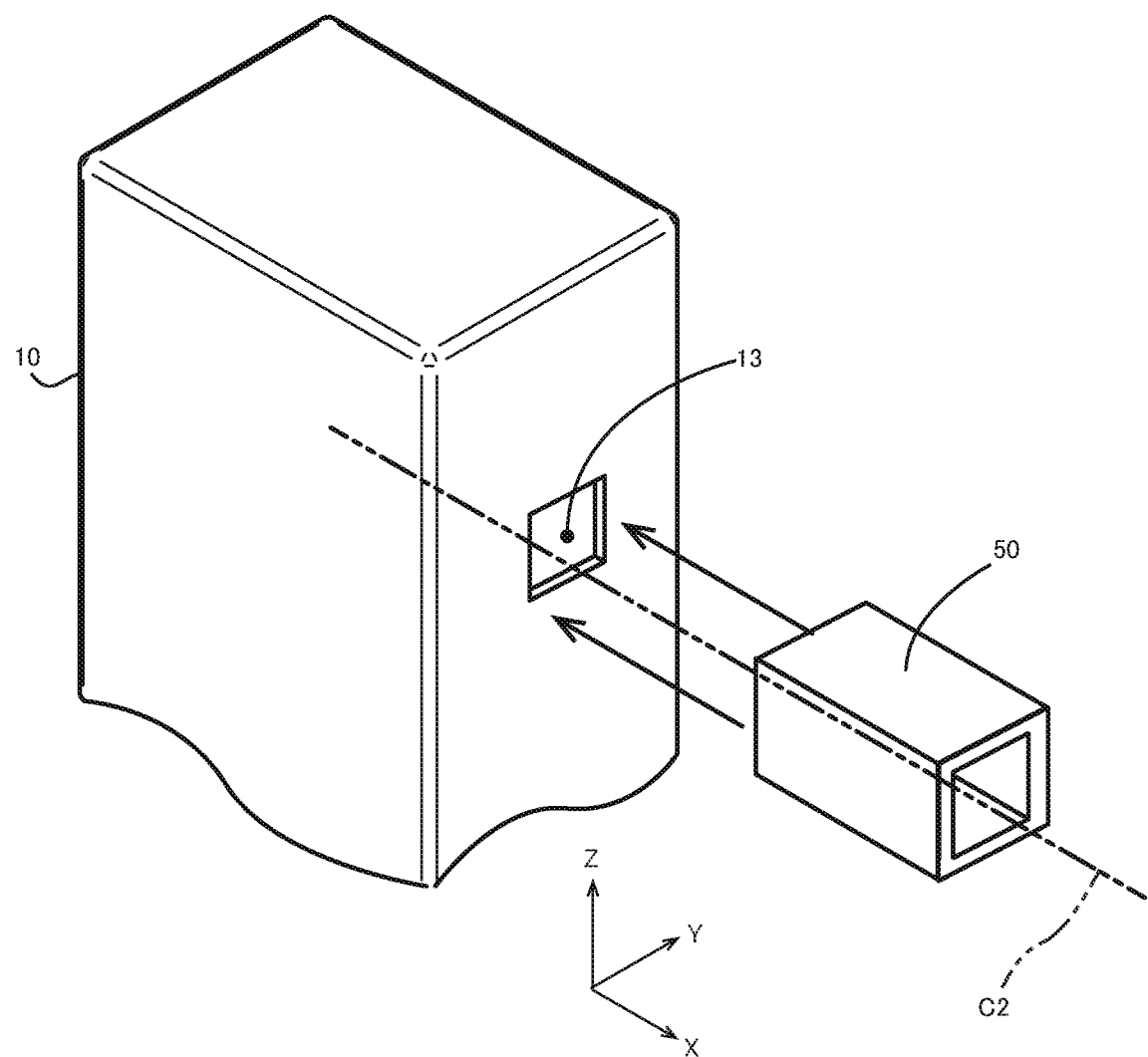
FIG. 12 is a perspective view of a housing opening with a rectangular-cylindrical holder.

A typical example of the restraining structure 50 is a holder 50 (hereinafter referred to as rectangular-cylindrical holder 50) that has a rectangular-cylindrical shape that matches the shape and outer dimensions of the block 40 in such a way that the block 40 can pass therethrough while leaving a small clearance with respect to the surrounding 4 surfaces. As illustrated in FIGS. 9 and 10, the rectangular-cylindrical holder 50 is fixed to peripheral edges of the housing opening 13 of the housing 10 with its flange. As illustrated in FIGS. 11 and 12, the rectangular-cylindrical holder 50 formed to have internal dimensions equivalent to outer dimensions of the block 40 or slightly larger than outer dimensions of the block 40 to support outer surfaces of the block 40 by inner surfaces of the rectangular-cylindrical holder 50 from the up-and-down and right-and-left directions.

According to the rectangular-cylindrical holder 50 configured as described above, the block 40 passing through the housing opening 13 is to be restrained by the rectangular-cylindrical holder 50 in positions with respect to 2 directions (Y-axis direction and Z-axis direction) orthogonal to the cylinder center line C1 (X-axis), so that the block 40 is delivered and withdrawn from and into the housing opening 13 through always the same position. At this time, the base line BL of the block 40 passing through the rectangular-cylindrical holder 50 always coincides with the movement axis C2. Accordingly, the entrance/exit position Pe for the block 40 always coincides with a position at which the movement axis C2 intersects the housing opening plane. In other words, the entrance/exit position Pe for the block 40 that enters and exits the housing 10 can be restrained by the rectangular-cylindrical holder 50 with respect to 2 directions (Y-axis direction and Z-axis direction) orthogonal to the cylinder center line C1 (X-axis).

In the linear expansion mechanism 1, the leading end position Pc of the block train 30 delivered from the housing 10 is fixed relative to the entrance/exit position Pe with respect to 2 directions (YZ) orthogonal to the cylinder center line C1 by the fixing mechanism. The fixing mechanism is constituted by a plurality of cylindrical bodies 21, 22, 23, and 24 (arm unit 20) assembled in a multi-stage nested structure. As described above, the forefront-end block 40 of the block train 30 is connected to the forefront-end cylindrical body 21 of the plurality of cylindrical bodies 21, 22, 23, and 24. The connection position is positioned such that the leading end position Pc of the block train 30 (in other words, the leading end position Pc of the forefront-end block 40) coincides with the movement axis C2, and the connection direction is oriented such that the base line BL of the block 40 is in parallel to the movement axis C2. Note that the leading end position Pc of the block train 30 is defined as a position at which the front end of the block body 41 of the forefront-end block 40 intersects the base line BL of the block 40.

Figure 13:
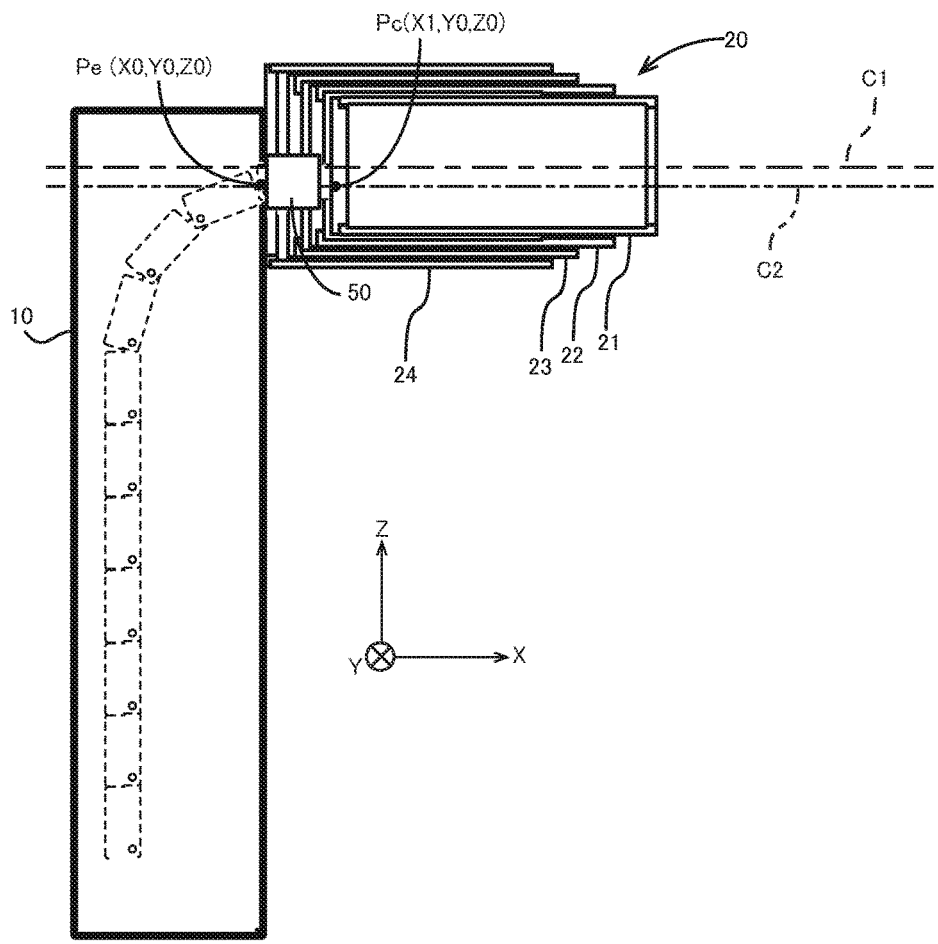
FIG. 13 is a side view illustrating a positional relation between the entrance/exit position for the block train while in a retracted state and a leading end position.
Figure 14:
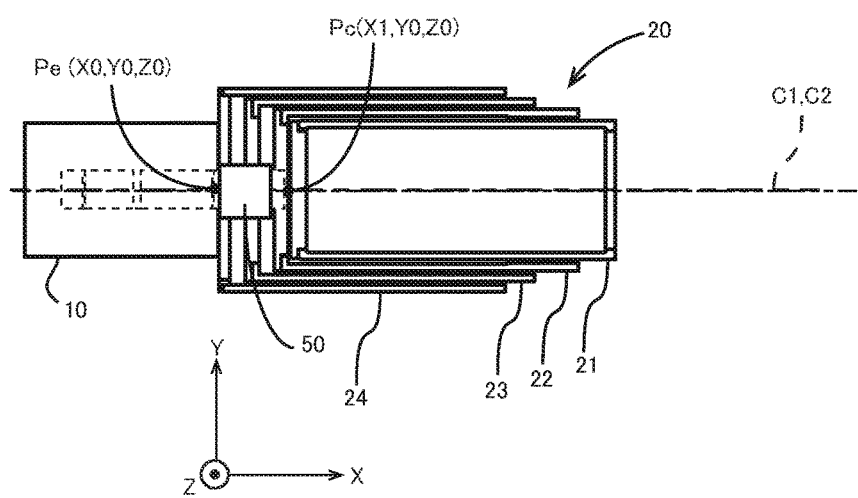
FIG. 14 is a plan view illustrating a positional relation between the entrance/exit position for the block train while in a retracted state and a leading end position.

Since the plurality of cylindrical bodies 21, 22, 23, and 24 are ruggedly assembled in a multi-stage nested structure, the arm unit 20 has high rigidity with respect to the 2 directions (YZ) orthogonal to the cylinder center line C1. In response to delivery and withdrawal actions of the block train 30, the leading end position Pc of the block train 30 is restrained by the arm unit 20 with respect to 2 directions (Y-axis direction and Z-axis direction) orthogonal to the cylinder center line C1. As illustrated in FIGS. 13 and 14, when the coordinates of the entrance/exit position Pe and the leading end position Pc of the retracted block train 30 are assumed to be (X1, Y1, Z1) and (X2, Y2, Z2) respectively, X1 is fixed, while X2 varies due to extension and retraction of the arm. In other words, X1 and X2 change relatively. On the other hand, the positional relation between Y1 and Y2 relative to each other is unchanged. Typically, Y2 always coincides with Y1. Similarly, the positional relation between Z1 and Z2 relative to each other is unchanged. Typically, Z2 always coincides with Z1.

Figure 15:
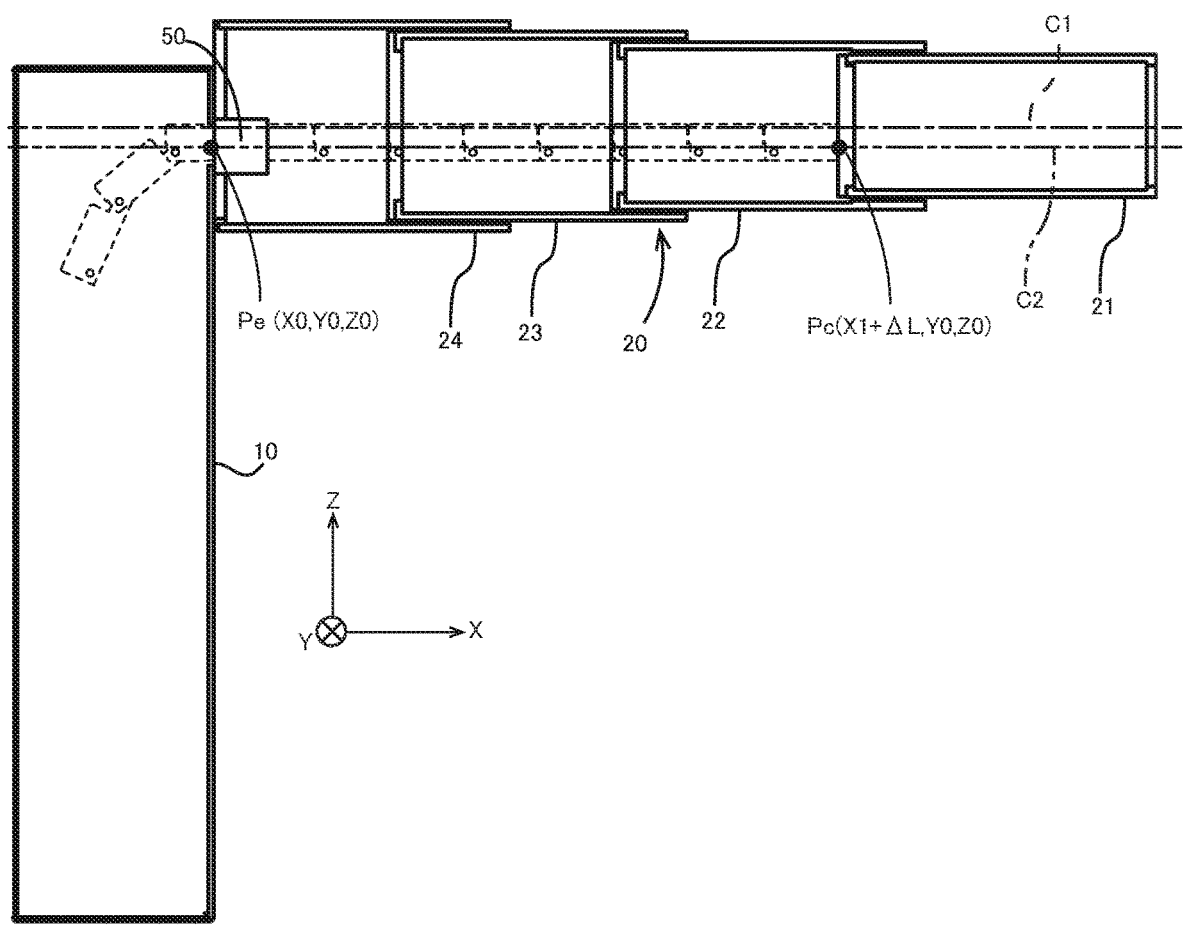
FIG. 15 is a side view illustrating a positional relation between the entrance/exit position for the block train while in an extended state and a leading end position.
Figure 16:
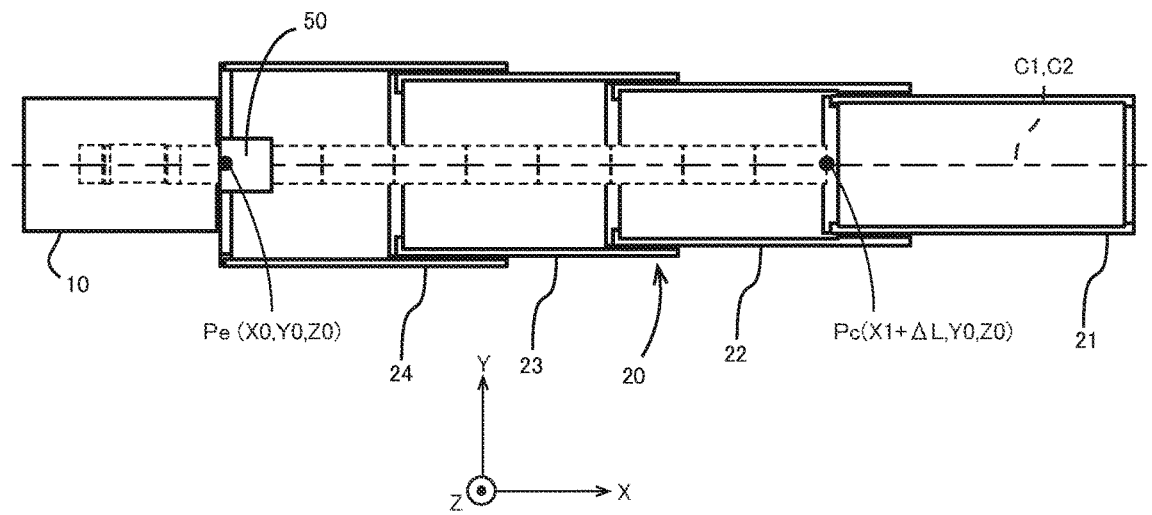
FIG. 16 is a plan view illustrating a positional relation between the entrance/exit position for the block train while in an extended state and a leading end position.

As illustrated in FIGS. 15 and 16, the coordinate of each of the entrance/exit position Pe and the leading end position Pc of the block train 30 when the arm unit 20 is extended ΔL from the retracted state can be represented as follows. Specifically, the entrance/exit position Pe for the block train 30 is not affected by the extending and retracting actions of the arm unit 20, and therefore is at always the same position (X1, Y1, Z1). On the other hand, since the block train 30 is linearly moved forward along the movement axis C2, and therefore the coordinate of the leading end position Pc of the block train 30 can be represented as (X2+ΔL, Y2, Z2). With respect to the Y-axis direction and the Z-axis direction, the leading end position Pc of the block train 30 is fixed relative to the entrance/exit position Pe, and therefore the Y and Z coordinates of the leading end position Pc are not changed by extension and retraction.

In this way, the arm unit 20 and the rectangular-cylindrical holder 50 are fixed to the housing portion 10. The arm unit 20 restrains the leading end position Pc of the block train 30 in the Y-axis direction and the Z-axis direction with respect to the housing 10. The rectangular-cylindrical holder 50 restrains the entrance/exit position Pe for the block train 30 located on the housing 10 in the Y-axis direction and the Z-axis direction. The leading end position Pc of block train 30 is positionally fixed with respect to the 2 directions relative to the entrance/exit position Pe for the block train 30 located on the housing 10. In other words, since the leading end position of the block train 30 delivered into the arm unit 20 and the trailing end position are fixed relative to each other with respect to the 2 directions, the block train 30 extends consistently linearly and retracts consistently linearly along the movement axis C2. It is thereby possible to secure the positional accuracy of the leading end of the arm unit 20. As a matter of course, since the entrance/exit position Pe for the block train 30 and the leading end position Pc are fixed by the restraining structure and the fixing mechanism, the block train 30 is less easily deflected up-and-down and right-and-left between the restraining structure and the fixing mechanism. Accordingly, no limitation may be imposed on the orientation of the linear expansion mechanism 1 to use. In other words, depending on the installation site, the linear expansion mechanism 1 is not only able to be installed vertically on a floor, but also able to be installed horizontally on a wall or hung from a ceiling, and can operate normally in any of the various installation postures as those described above.

According to the linear expansion mechanism 1 according to the embodiment, an external force and a load applied in a direction parallel to the cylinder center line C1 can securely be received by the blocks 40, the front and trailing end faces of which abut against each other when the blocks 40 are linearly arranged to form a rigid body. Loads applied in 2 directions orthogonal to the cylinder center line C1 are received by a plurality of cylindrical bodies 21, 22, 23, and 24 assembled in a multi-stage nested structure. Accordingly, loads applied in all directions of the orthogonal 3 axes are to be burdened by the cylindrical bodies 21, 22, 23, and 24 assembled in a multi-stage nested structure and the block train 30 in a distributed manner. In this way, it is possible to secure high rigidity for the arm unit 20 to prevent a torsion and a rattling in front-back direction in addition to up-and-down and right-and-left deflections as much as possible.

Figure 17:
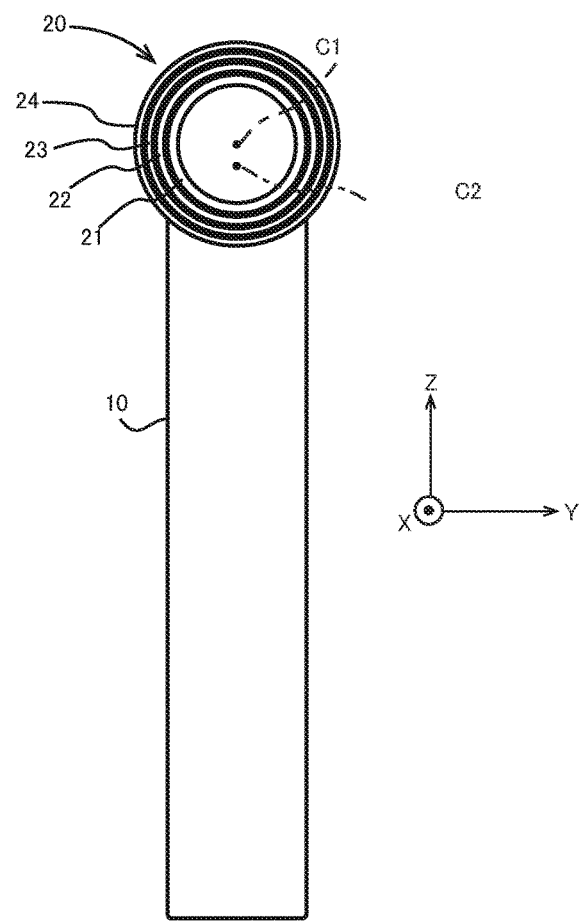
FIG. 17 is a front view illustrating a positional relation between the cylinder center line and the movement axis of the block train.

As illustrated in FIG. 17, the movement axis C2 along which the block train 30 linearly moves is offset with respect to the cylinder center line C1. In other words, the rectangular-cylindrical holder 50 is attached to the housing 10 in such a way that the base line BL (movement axis C2) of the block train 30 that passes through the rectangular-cylindrical holder 50 does not coincide with and is offset from the cylinder center line C1 of the cylindrical bodies 21, 22, 23, and 24. In this way, rotation (axial rotation) of the cylindrical bodies 21, 22, 23, and 24 around the cylinder center line C1 can effectively be suppressed by the block train 30. Further, the movement axis C2 is offset below the cylinder center line C1 in the gravity direction. Accordingly, a load steadily applied downward on the cylindrical bodies 21, 22, 23, and 24 can be burdened not only by the cylindrical bodies 21, 22, 23, and 24 but also by the block train 30 in a distributed manner, and it is possible to improve the entire rigidity for the arm unit 20. Further, compared to the case where the block train 30 is arranged such that the movement axis C2 coincides with the cylinder center line C1, the inner space of the cylindrical bodies 21, 22, 23, and 24 can more effectively be used.

In the embodiment, a plurality of cylindrical bodies 21, 22, 23, and 24 assembled in a nested structure are adopted as the fixing mechanism (arm unit 20) for such purposes as securing the rigidity. However, the fixing mechanism may be of any polygonal cylindrical body such as a triangular-cylindrical body and a rectangular-cylindrical body, or may be of any other cylindrical bodies such as elliptic cylindrical bodies assembled in a nested structure.

Figure 18:
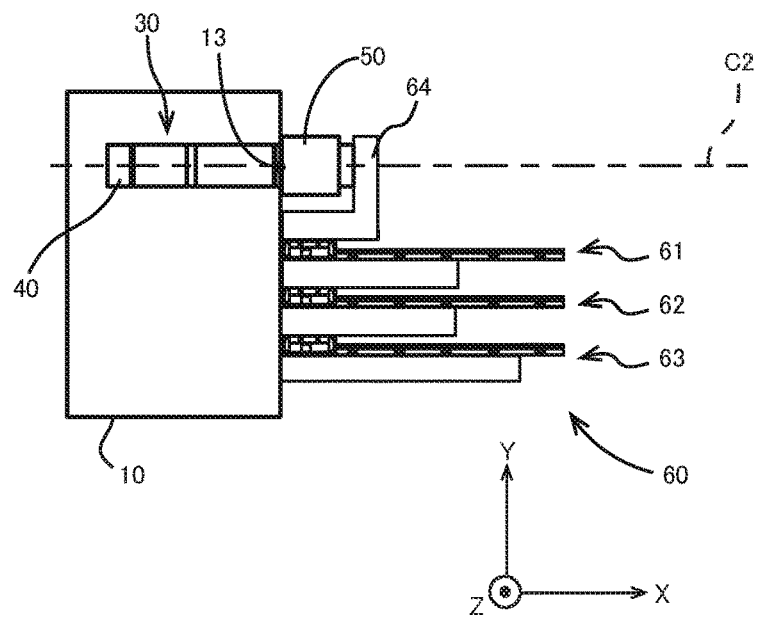
FIG. 18 is a plan view a linear expansion mechanism with a plurality of cascaded linear motion guide mechanisms that substitute for a telescopic structure.
Figure 19:
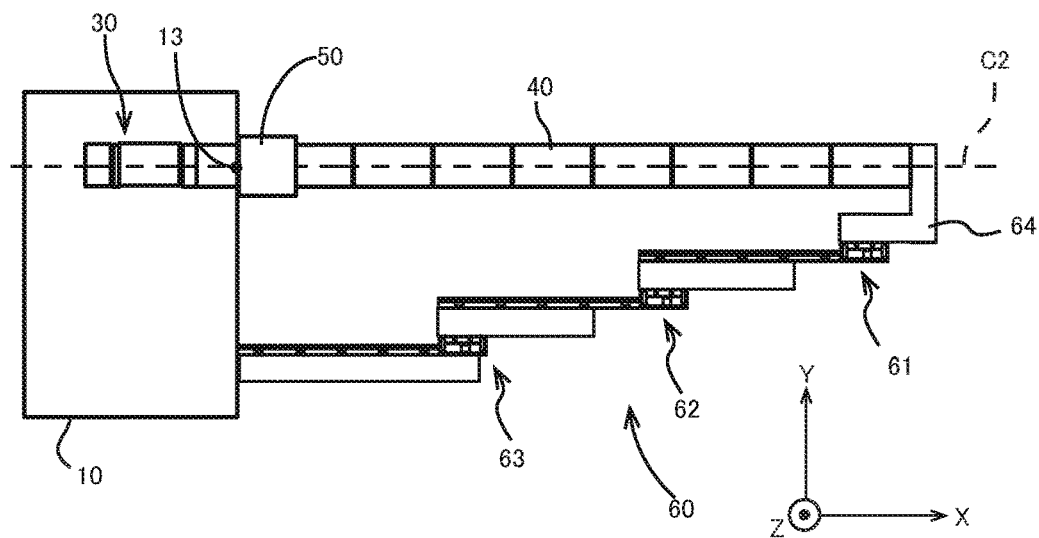
FIG. 19 is a plan view illustrating extended linear expansion mechanisms in FIG. 18.

Provided that the relative position of the leading end of the block train delivered from the housing can be fixed relative to the entrance/exit position Pe with respect to 2 directions orthogonal to the coupling direction, the fixing mechanism may not be limited to a plurality of cylindrical bodies 21, 22, 23, and 24 ruggedly assembled in a multi-stage nested structure. The fixing mechanism may be constituted by a plurality of cascaded linear motion guide mechanisms. For example, as illustrated in FIGS. 18 and 19, a base that supports a rail of a tail-end linear motion guide mechanism 63 among such a plurality of linear motion guide mechanisms 61, 62, and 63 is fixed horizontally to the housing 10, and a slider of the forefront-end linear motion guide mechanism 61 is connected to the forefront-end block 40 of the block train 30 via an L-shaped connector 64. The plurality of linear motion guide mechanisms 61, 62, and 63 have high rigidity with respect to 2 directions (Y-axis direction and Z-axis direction) orthogonal to its sliding direction (X-axis direction). Accordingly, the plurality of linear motion guide mechanisms 61, 62, and 63 allow the leading end position of the block train 30 to be fixed relative to the entrance/exit position for the block train 30 with respect to the Y-axis direction and the Z-axis direction. In other words, a linear expansion mechanism in which a linear motion guide mechanism is adopted as the fixing mechanism also produces an effect similar to the linear expansion mechanism 1 in which a telescopic structure is adopted as the fixing mechanism.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A linear expansion mechanism comprising:
   a hollow columnar housing having an opening on a side surface at an upper end of the housing;
   a holder having a rectangular-cylindrical shape with an internal space connected through the opening to an internal space of the housing, and fixed to the housing at the opening of the housing;
   a linearly expandable arm having cylindrical bodies assembled in a telescopic structure, a rear end of the arm being fixed to the upper end of the housing such that the arm maintains an attitude expanding in a direction orthogonal to an axis of the columnar housing; and
   a block train made up of a plurality of blocks coupled along a coupling direction, each of the blocks having a rectangular parallelepiped shape,
   wherein the block train is accommodated inside the housing and configured to be drawn through the holder, the block train being threaded through inside of the arm;
   wherein the block train is configured to be delivered from the housing such that the arm expands, and to be drawn into the housing such that the arm contracts; and
   wherein, for suppressing deformation of the block train, thereby maintaining the block train in a linear shape inside the arm,
      a leading end of the block train is connected to a front-end of the arm, which restricts movement of the block train in horizontal directions, orthogonal to the expanding direction of the arm, and
      the holder has an inner wall having a rectangular-cylindrical shape fitting with an outer shape of the block so as to allow the block train to pass through the holder, while restricting movement of the block train in vertical and horizontal directions, orthogonal to the expanding direction of the arm,
      the inner wall of the holder abuts the block passing through the holder,
      a movement center axis of the block train is offset downward from a center line of the cylindrical bodies assembled in the telescopic structure.

2. The linear expansion mechanism according to claim 1, wherein
   the arm is constituted by a plurality of cylindrical bodies assembled in a multi-stage nested structure, and
   a tail-end cylindrical body among the plurality of cylindrical bodies is fixed to the housing.

3. The linear expansion mechanism according to claim 1, wherein the block train is offset with respect to a central axis of the arm expanding in the direction orthogonal to the axis of the columnar housing.

4. The linear expansion mechanism according to claim 1, wherein
   the blocks are coupled to each other to comprise a linearly arranged form, in which adjacent blocks are allowed to be respectively rotated about a limited angular range, such that the linearly arranged form is bendable in one direction and non-bendable in an opposite direction.

5. The linear expansion mechanism according to claim 1, wherein
   a load applied in the coupling direction is received by the block train, and
   loads applied in two directions orthogonal to the coupling direction are received by a plurality of cylindrical bodies assembled in a multi-stage nested structure or a plurality of cascaded linear motion guide mechanisms,
   a trailing end of the plurality of cylindrical bodies assembled in a multi-stage nested structure or the plurality of cascaded linear motion guide mechanisms being fixed to the housing.

\* \* \* \* \*